April 14, 1964 G. O. MATTER 3,128,915
MEASURING DISPENSER
Filed Oct. 16, 1961
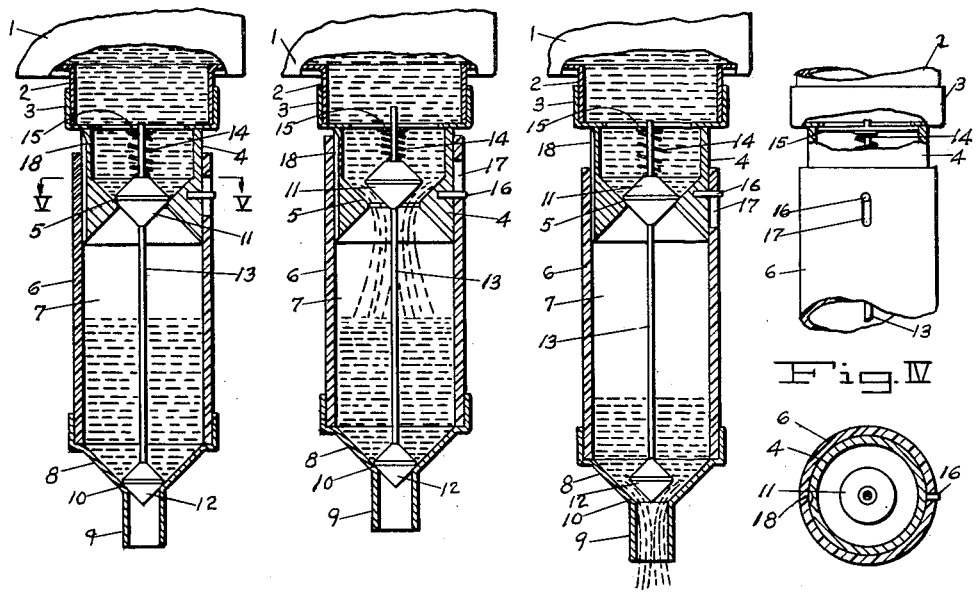
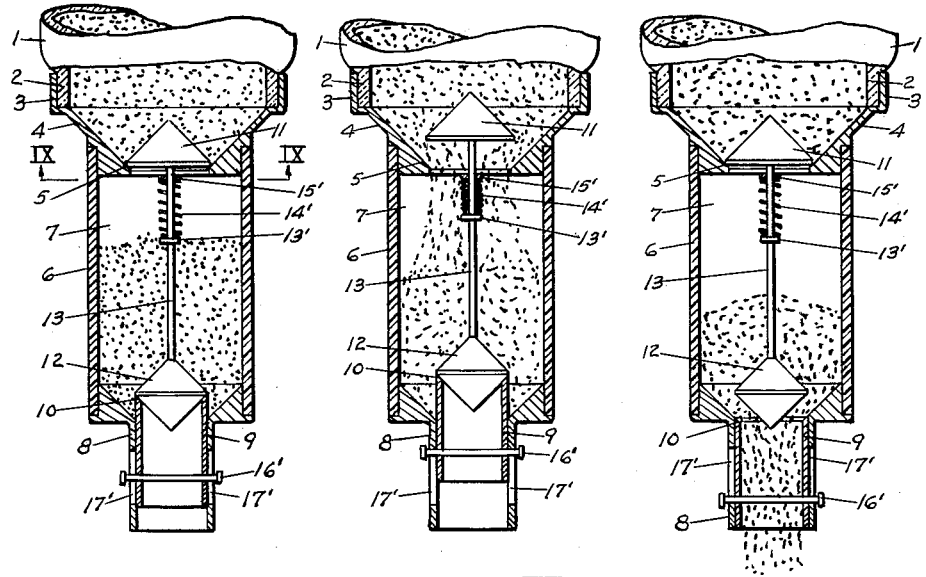
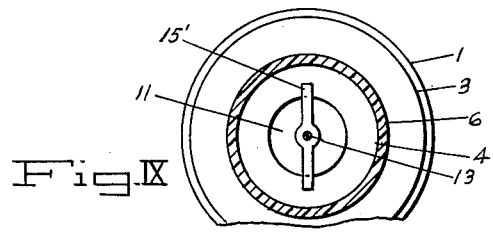
INVENTOR.
Gustave O. Matter

United States Patent Office 3,128,915
Patented Apr. 14, 1964

3,128,915
MEASURING DISPENSER
Gustave O. Matter, 3112 NE. 46th Ave., Portland, Oreg.
Filed Oct. 16, 1961, Ser. No. 145,085
10 Claims. (Cl. 222—156)

My invention relates to measuring dispensers of the type adapted to dispense a measured amount of a free-flowing substance, including liquid, granulated and powdered substance, from a container.

An object of this invention is in a dispenser which can regulate the amount of substance dispensed from its container.

Another object is in a dispenser wherein any desired measured amount of contents, within the capacity of the dispenser measuring compartment, can be allowed to pass from the container into the dispenser measuring compartment by manual operation and control of the dispenser and the measured amount retained in the measuring compartment is determined by visual observation.

Another object is in a dispenser wherein direct flow of contents from its container is interrupted.

Another object is in a dispenser adapted to allow a predetermined amount of liquid, granulated or powdered substance to flow from its container.

Another object is in a dispenser adapted to be easily attached securely to a container and easily detached therefrom.

Further objects and advantages of the invention will appear in and from the following specification considered in connection with the accompanying drawings, which are for purpose of illustration and not intended as a definition of the invention, the invention being defined in the appended claims.

Referring to the drawings, in which like characters of reference indicate corresponding parts throughout the several views:

FIGS. I to V inclusive illustrate one form of the dispenser attached to the outlet of a container and in operative position adapted to dispense a measured amount of liquid substance from the container.

FIGS. VI to IX inclusive illustrate a modified form of the dispenser attached to the outlet end of a container and in operative position adapted to dispense a measured amount of powdered or granulated substance from the container.

FIG. I is a vertical section of the dispenser and the container outlet with the measuring compartment inlet and outlet valves shown closed.

FIG. II is a vertical section similar to FIG. I but showing the measuring compartment inlet valve open and the outlet valve closed.

FIG. III is a vertical section similar to FIG. I but showing the measuring compartment inlet valve closed and the outlet valve open.

FIG. IV is a right hand side elevation, with a portion in section, of the upper portion of FIG. III.

FIG. V is a horizontal section on line V—V of FIG. I.

FIG. VI is a vertical section of a modified form of the dispenser and outlet end of the container with the measuring compartment inlet and outlet valves shown closed.

FIG. VII is a vertical section similar to FIG. VI but showing the measuring compartment inlet valve open and the outlet valve closed.

FIG. VIII is a vertical section similar to FIG. VI but showing the measuring compartment inlet valve closed and the outlet valve open.

FIG. IX is a horizontal section on line IX—IX of FIG. VI.

Referring to the numerals on the drawings:

As shown in FIGS. I to V inclusive, a container 1 has an outlet 2 to which the dispenser is mounted as by flange 3; depending from the flange 3 a wall 4 provides therewithin a measuring compartment inlet valve seat 5; a vertical side wall 6 of the measuring compartment 7 is slidably mounted, at its upper end, to the outer surface of the wall 4 and extends downward therefrom to the measuring compartment outlet end 8 which provides the outlet 9 and outlet valve seat 10; the measuring compartment 7 is bounded on the side by the side wall 6, on the upper end by the inlet valve seat 5 and at the lower end by the outlet end 8 and the outlet valve seat 10; the inlet valve 11 is operatively connected to the outlet valve 12 and is operated in unison therewith, as by valve stem 13; a compression spring 14 is mounted between the upper end of the inlet valve 11 and a cross member 15 secured at each end to the upper end of the wall 4; the vertical movement of the outlet valve seat 10 relative to the inlet valve seat 5 is governed by the pin 16 mounted in the wall 4 and which is operative in the slot 17 in the measuring compartment side wall 6; an air vent 18 is provided in the outer surface of the wall 4, to permit air to pass into or out of the upper end of the measuring compartment 7.

As shown in FIGS. VI to IX inclusive, a container 1 has an outlet 2 to which the dispenser is mounted as by flange 3; depending from the flange 3 a wall 4 provides therewithin a measuring compartment inlet valve seat 5; a vertical side wall 6 of the measuring compartment 7 extends downward from the upper end of the measuring compartment 7 to the measuring compartment outlet end 8 which provides the outlet 9 and outlet valve seat 10, the outlet 9 with its seat 10 is slidably mounted within the outlet end 8; the measuring compartment 7 is bounded on the side by the side wall 6, at the upper end by the inlet valve seat 5 and at the lower end by the outlet end 8 with the outlet 9 and valve seat 10; the inlet valve 11 is operatively connected in fixed relation to the outlet valve 12 and is operated in unison therewith as by valve stem 13; a compression spring 14' is mounted between a collar 13' on the valve stem 13 and a cross member 15' secured at each end to the lower end of the wall 4; the vertical movement of the outlet valve seat 10 relative to the inlet valve seat 5 is governed by the pin 16' mounted in the outlet 9 and which is operative in the slots 17' in the outlet end 8.

In the operation of the dispenser as disclosed in FIGS. I, II and III, which illustrates, for example, the dispensing of a liquid substance, the outlet valve seat 10, which is part of a movable unit which includes the side wall 6, lower end 8 and outlet 9, is moved upward, manually and unopposed by any downward mechanical force, until the outlet valve is closed by contact, of the seat 10, with the outlet valve 12 and then the unit, with the seat 10 against the outlet valve 12, is manually moved further upward until the lower end of the slot 17 stops against the pin 16 and the outlet valve 12 is moved upward, against the pressure of spring 14, and inlet valve 11 is raised up off its seat 5, as shown in FIG. II, thereby allowing contents to flow from the container 1 and into the measuring compartment 7.

When, by observation, through the side wall 6, into the measuring compartment 7, the desired amount of contents, to be dispensed, has entered the measuring compartment 7 the outlet valve seat 10, outlet valve 12 and inlet valve 11 are permitted to be lowered, as by the pressure of spring 14, until the inlet valve 11 is stopped by its seat 5, as shown in FIG. I, thereby retaining the measured amount of contents in the measuring compartment 7. The outlet valve seat 10 is then moved further downward, manually and unopposed by any upward mechanical force, until it is stopped by the pin 16 contacting the upper end of the slot 17 and the outlet valve seat 10 is lowered away from its valve 12 thereby allowing the contents in the measuring compartment 7 to flow out the outlet 9.

Assuming that the maximum capacity of the measuring compartment 7 is two ounces and it is desired to dispense two ounces of the contents then there would be no need for the side wall 6, of the measuring compartment 7, to be of a translucent or transparent material, when dispensing a granulated material, but if, as illustrated in FIGS. I–II and III, it is desired to dispense only one ounce it would be necessary to observe when the measuring compartment is half full and then at least a portion of the side wall 6 would need be of a material suitable to permit observation into the measuring compartment 7. An air vent 18 is provided to prevent a back pressure or a vacuum in the measuring compartment when dispensing a liquid substance.

In the dispenser as disclosed in FIGS. VI–VII and VIII, which illustrates, for example, the dispensing of a granulated or powdered substance, the operation is similar to that stated above for FIGS. I–II and III. The outlet valve seat 10, which is part of a movable unit which includes the pin 16' and outlet 9, is moved upward, manually and unopposed by any downward mechanical force, until the outlet valve is closed by contact, of the seat 10, with the outlet valve 12 and then the unit, with the seat 10 against the outlet valve 12, is manually moved further upward until the pin 16' is stopped by the upper end of the slots 17' and the outlet valve 12 is moved upward, against the pressure of spring 14', and inlet valve 11 is raised up off its seat 5, as shown in FIG. VII, thereby allowing contents to gravitate from the container 1 and into the measuring compartment 7.

When, by observation into the measuring compartment, the desired amount of contents, to be dispensed, has entered the measuring compartment 7 the outlet valve seat 10, outlet valve 12 and inlet valve 11 are permitted to be lowered, as by the pressure of spring 14', until the inlet valve 11 is stopped by its seat 5, as shown in FIG. VI, thereby retaining the measured amount of contents in the measuring compartment 7. The outlet valve seat 10 is then moved further downward, manually and unopposed by any upward mechanical force, until it is stopped by the pin 16', in the outlet 9, contacting the lower end of the slots 17' in the outlet end 8 and the outlet valve seat 10 is lowered away from its valve 12 thereby allowing the contents in the measuring compartment 7 to gravitate out the outlet 9.

Assuming that the maximum capacity of the measuring compartment 7 is three ounces and it is desired to dispense three ounces of the contents then there would be no need for the side wall 6 of the measuring compartment 7 to be of a translucent or transparent material, except when dispensing a liquid substance, but if, as illustrated in FIGS. VI–VII and VIII, it is desired to dispense only two ounces it would be necessary to observe when the measuring compartment 7 is two-thirds full and then at least a portion of the side wall 6 would need be of a material suitable to permit observation into the measuring compartment 7.

And another advantage of the dispenser being adapted for manual operation and control and to allow the operator to visually observe the amount of contents in the measuring compartment is that, for example, if the maximum capacity of the measuring compartment is three ounces and it is desired to dispense one ounce of the contents at a time the operator could then allow the measuring compartment to become full and with both the inlet and outlet valves closed the three ounces would be retained in the measuring compartment and then to dispense one ounce, of the contents, the operator would open the outlet valve and at the same time would visually observe when one third of the contents has passed from the measuring compartment and would then immediately close the outlet valve and the remaining two ounces would be retained in the measuring compartment for further dispensing.

It is to be understood that the spring 14 shown in FIGS. I to V inclusive or the spring 14' shown in FIGS. VI to IX inclusive would not be essential in the operation of the dispenser illustrated when the combined weight of the inlet valve 11, outlet valve 12 and valve stem 13 is sufficient to close the inlet valve 11 when the outlet valve seat 10 is lowered manually by the operator.

And, for illustration, if the dispenser is attached to a conventional water line leading from a reservoir or tank or other container, any desired measured amount of the liquid, within the maximum capacity of the dispenser measuring compartment, could be dispensed and the amount controlled manually by the operator, even though the liquid, when entering the dispenser, is under pressure and then this pressure would assist in holding the inlet valve down on its seat without any spring or other mechanical means.

It has been ascertained, by experiment, that when using a device of this structure, to dispense a liquid substance, an air vent which permits air to pass freely into or out of the upper end of the measuring compartment, to prevent a back pressure in the measuring compartment while the liquid is passing thereinto or to prevent a vacuum in the measuring compartment while the liquid is passing therefrom, is an essential aid in dispensing a measured amount of liquid from the measuring compartment, therefore the air vent 18 is open at all times to permit air to pass freely and uncontrolled into or out of the measuring compartment 7 when dispensing a liquid substance.

If the dispenser is in the operating position to dispense a measured amount of liquid, as illustrated in FIGS. I, II and III of the drawing or if attached to the outlet of a conventional water line, as outlined above, and the inlet valve 11 is held open and the outlet valve is closed, after the measuring compartment 7 is full, then the pressure in the measuring compartment 7 would force the liquid out through the air vent 18, and to prevent such an occurrence is one reason for the measuring compartment side wall 6 having at least a portion thereof adapted to permit the operator of the dispenser to determine, by visual observation, when the exact desired amount of contents, to be dispensed, has entered the measuring compartment or when the measuring compartment is full and then the operator will immediately close the inlet valve 11 and thereby prevent the liquid from being forced out through the air vent 18.

When the device is used to dispense a measured amount of a granulated substance, such as coffee, there would be no need of the air vent 18 but the air vent would have no adverse effect on the operation of the device; in other words, when the air vent is included in the structure of the device of applicant, the device is adapted to dispense a measured amount of either a liquid or a granulated substance but if the air vent is omitted in the structure the device would be adapted to dispense the granulated substance but not the liquid.

But in either case the manual control and the visual observation of the amount of material to enter the measuring compartment in the structural combination of the device are essential and beneficial in the correct and accurate dispensing of the desired amount of substance.

Some of the several advantageous results to be obtained with a measuring dispenser constructed as illustrated and described in this application are:

With the side wall of the measuring compartment having at least a portion thereof adapted for visual observation into the measuring compartment, (1) the operator can easily ascertain when the measuring compartment is filled and thereby accurately dispense an amount equal to the maximum capacity of the measuring compartment, (2) when the measuring compartment is filled the operator can, by visual observation, dispense any desired proportion of the amount in the measuring compartment, (3) by visual observation, the operator can allow only the amount desired, to enter the measuring compartment, before dispensing, (4) when an air vent, of the type shown, is included in the combination, when dispensing a liquid substance, it is possible to visually observe when the measuring compartment is filled and then the inlet valve can be closed to prevent any liquid from being forced out through the air vent, this also applies when the dispenser is attached to an outlet of a conventional water line or the like.

With the air vent, of the type shown, included in the combination, when dispensing a liquid substance, (5) the air vent being open at all times and being positioned in such a manner as to require no operating elements whatsoever, is so simple as to require no additional elements when the air vent is included in the construction, (6) the open air vent allows air to pass freely into or out of the measuring compartment, as required, to prevent a vacuum or a back pressure in the measuring compartment when dispensing a liquid substance, the operation of the inlet and the outlet valves has no effect on the functioning of the air vent which is automatically controlled by the requirements of the liquid passing into and out of the measuring compartment.

Although I have illustrated and described various embodiments of my invention, I do not intend to be limited to the specific disclosures contained herein since various changes, modifications, and substitutions may be incorporated in the embodiments disclosed without departing from the spirit of the invention, and I hereby reserve the right to all such changes, modifications and substitutions as properly come within the scope of the appended claims.

I claim as my invention:

1. A dispenser for attachment to the outlet of a container, said dispenser comprising a measuring compartment having an upper inlet end, a lower outlet end and a vertical side wall surrounding and defining said measuring compartment between said inlet end and said outlet end, a measuring compartment inlet valve and an inlet valve seat between the container outlet and the said inlet end of said measuring compartment, a wall extending upwardly from the upper end of said measuring compartment and surrounding said inlet valve and said inlet valve seat, the upper end of said side wall of said measuring compartment being slidably mounted on said wall surrounding said inlet valve and said inlet valve seat, said inlet valve secured to the upper end of a valve stem, an outlet valve secured to the lower end of said valve stem, said inlet valve and said outlet valve with said valve stem thereby being operative in unison, said outlet end provides an outlet valve seat for said outlet valve, said outlet end with said outlet valve seat and said measuring compartment side wall being movable vertically, as a unit, said outlet end and said measuring compartment side wall being entirely accessible to manually move said unit in a direction toward said inlet valve seat thereby to raise said outlet valve seat to said outlet valve and to raise said outlet valve with its seat and to raise said inlet valve away from its seat thereby allowing contents to pass from the container into said measuring compartment, said measuring compartment side wall having at least a portion thereof adapted to permit the operator of the dispenser too determine, by visual observation, when the exact desired amount of contents, to be dispensed, has entered the measuring compartment and then said unit is manually moved in a direction away from said inlet valve seat thereby to lower said outlet valve with its seat and to lower said inlet valve to its seat thereby retaining the desired amount of contents in said measuring compartment, said unit is then moved further, manually, in the direction away from said inlet valve seat to lower said outlet valve seat from said outlet valve and allow the measured contents to pass out from said measuring compartment.

2. A dispenser for attachment to the outlet of a container, said dispenser comprising a measuring compartment having an upper inlet end, a lower outlet end and a vertical side wall surrounding and defining said measuring compartment between said inlet end and said outlet end, a measuring compartment inlet valve and an inlet valve seat between the container outlet and said upper inlet end of said measuring compartment, a wall extending upwardly from the upper end of said measuring compartment and surrounding said inlet valve and said inlet valve seat, said inlet valve secured to the upper end of a valve stem in fixed relation to an outlet valve secured to the lower end of said valve stem, said inlet valve and said outlet valve with said valve stem thereby being operative in unison, and outlet valve seat for said outlet valve, said outlet valve seat being on the upper end of an outlet which is slidably mounted in said outlet end, said outlet with said outlet valve seat being adapted for manual movement, as a unit, in a direction toward said inlet valve seat thereby to raise said outlet valve seat to said outlet valve and to raise said outlet valve with its seat and to raise said inlet valve away from its seat thereby allowing contents to pass from the container into said measuring compartment, said measuring compartment side wall having at least a portion thereof adapted to permit the operator of the dispenser to determine, by visual observation, when the exact desired amount of contents, to be dispensed, has entered the measuring compartment and then said unit is manually moved in a direction away from said inlet valve seat thereby to lower said outlet valve with its seat and to lower said inlet valve to its seat thereby retaining the desired amount of contents in said measuring compartment, said unit is then moved further, manually, in the direction away from said inlet valve seat to lower said outlet valve seat from said outlet valve and allow the measured contents to pass out from said measuring compartment.

3. The invention according to claim 2 wherein a compression spring is included in the structure to exert sufficient force to assist in the closure of said inlet valve on its seat when the combined weight of said inlet valve, said outlet valve and said valve stem is insufficient to close said inlet valve when said dispenser is in dispensing position.

4. The invention according to claim 3 wherein said spring is mounted between the top of said inlet valve and the upper end of said wall extending upward from the upper end of said measuring compartment.

5. The invention according to claim 3 wherein said spring is mounted on said valve stem between a collar on said valve stem and the under side of said inlet valve seat.

6. The invention according to claim 2 wherein there is an open air vent adapted to permit air to pass freely and uncontrolled out of the top of said measuring compartment to prevent a back pressure therein while dispensing a liquid substance, said air vent adapted to permit air to pass freely and uncontrolled into the top of said measuring compartment to prevent a vacuum therein while dispensing a liquid substance.

7. The combination recited in claim 1 with a compression spring included in the structure to exert sufficient force to assist in the closure of said inlet valve on its seat when the combined weight of said inlet valve, said outlet valve and said valve stem is insufficient to close said inlet valve when said dispenser is in dispensing position.

8. The combination recited in claim 7 wherein said spring is mounted between the top of said inlet valve and the upper end of said wall extending upward from the upper end of said measuring compartment.

9. The combination recited in claim 7 wherein said spring is mounted on said valve stem between a collar on said valve stem and the under side of said inlet valve seat.

10. The combination recited in claim 1 with an air vent adapted to permit air to pass into or out of the top of said measuring compartment.

References Cited in the file of this patent

UNITED STATES PATENTS

| | | |
|---|---|---|
| 1,064,150 | McDaniel et al. | June 10, 1913 |
| 1,538,214 | Rath | May 19, 1925 |
| 1,988,865 | Cambell | Jan. 22, 1935 |
| 2,054,881 | Saunders | Sept. 22, 1936 |
| 2,197,142 | Cannon et al. | Apr. 16, 1940 |
| 2,300,546 | Griest | Nov. 3, 1942 |
| 2,825,491 | Engstrom | Mar. 4, 1958 |
| 2,873,050 | Halverson | Feb. 10, 1959 |